May 3, 1960      M. H. CUBBERLEY      2,935,482
APPARATUS FOR TREATING SODIUM SILICATE TO PRODUCE A SILICA SOL
Filed Jan. 28, 1953

May 3, 1960 M. H. CUBBERLEY 2,935,482
APPARATUS FOR TREATING SODIUM SILICATE TO PRODUCE A SILICA SOL
Filed Jan. 28, 1953 4 Sheets-Sheet 2
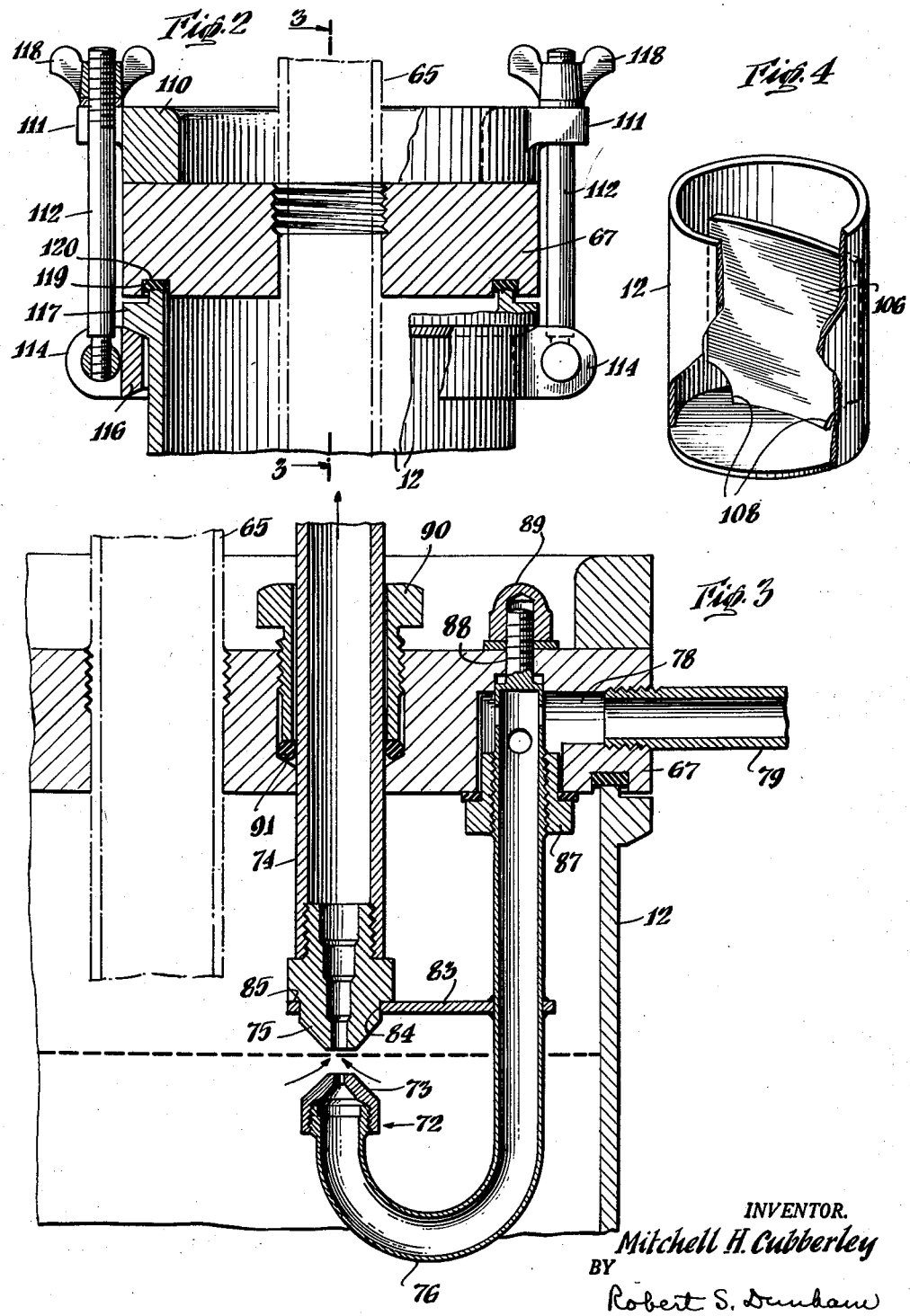
INVENTOR.
Mitchell H. Cubberley
BY
Robert S. Dunham
ATTORNEY

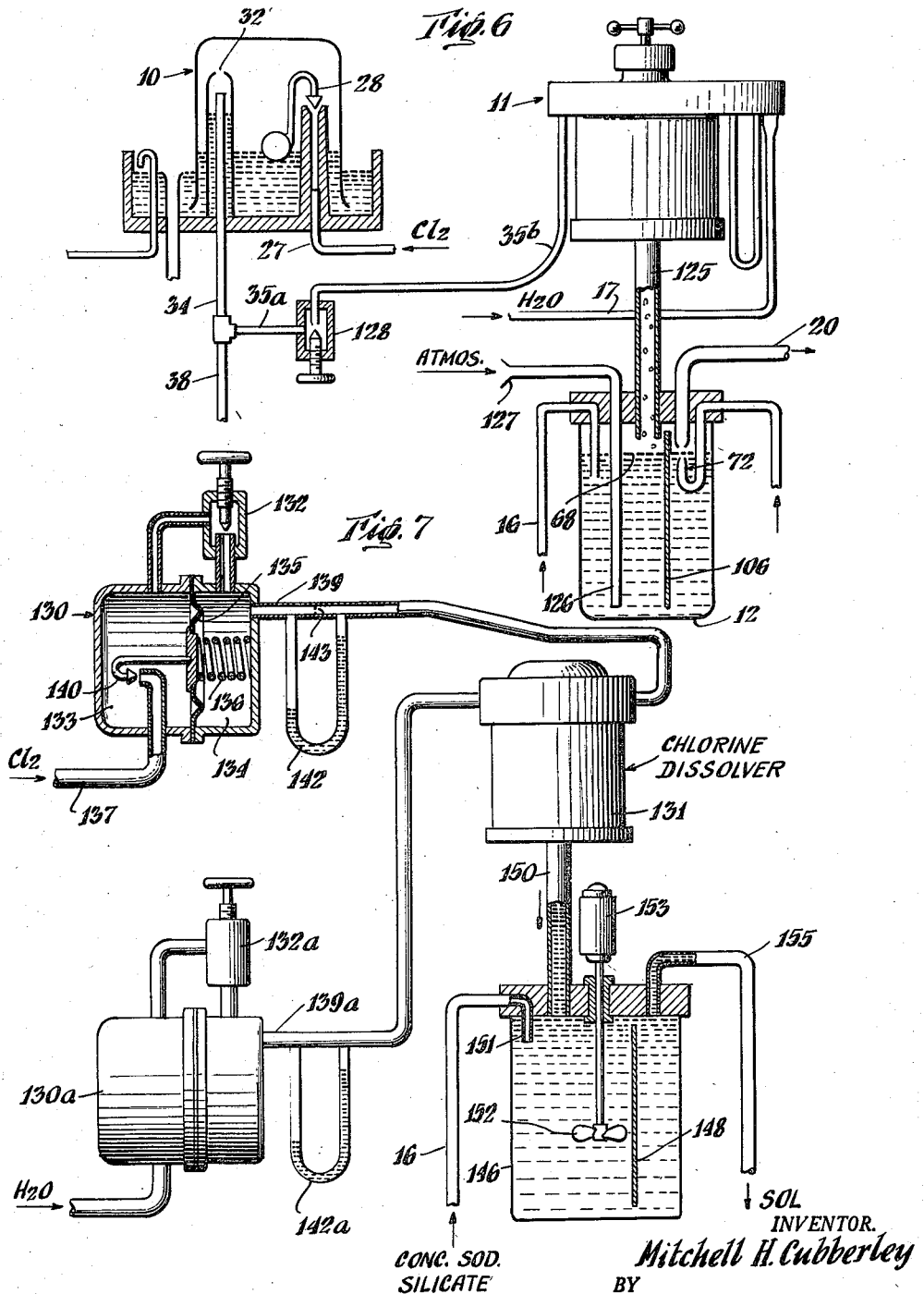

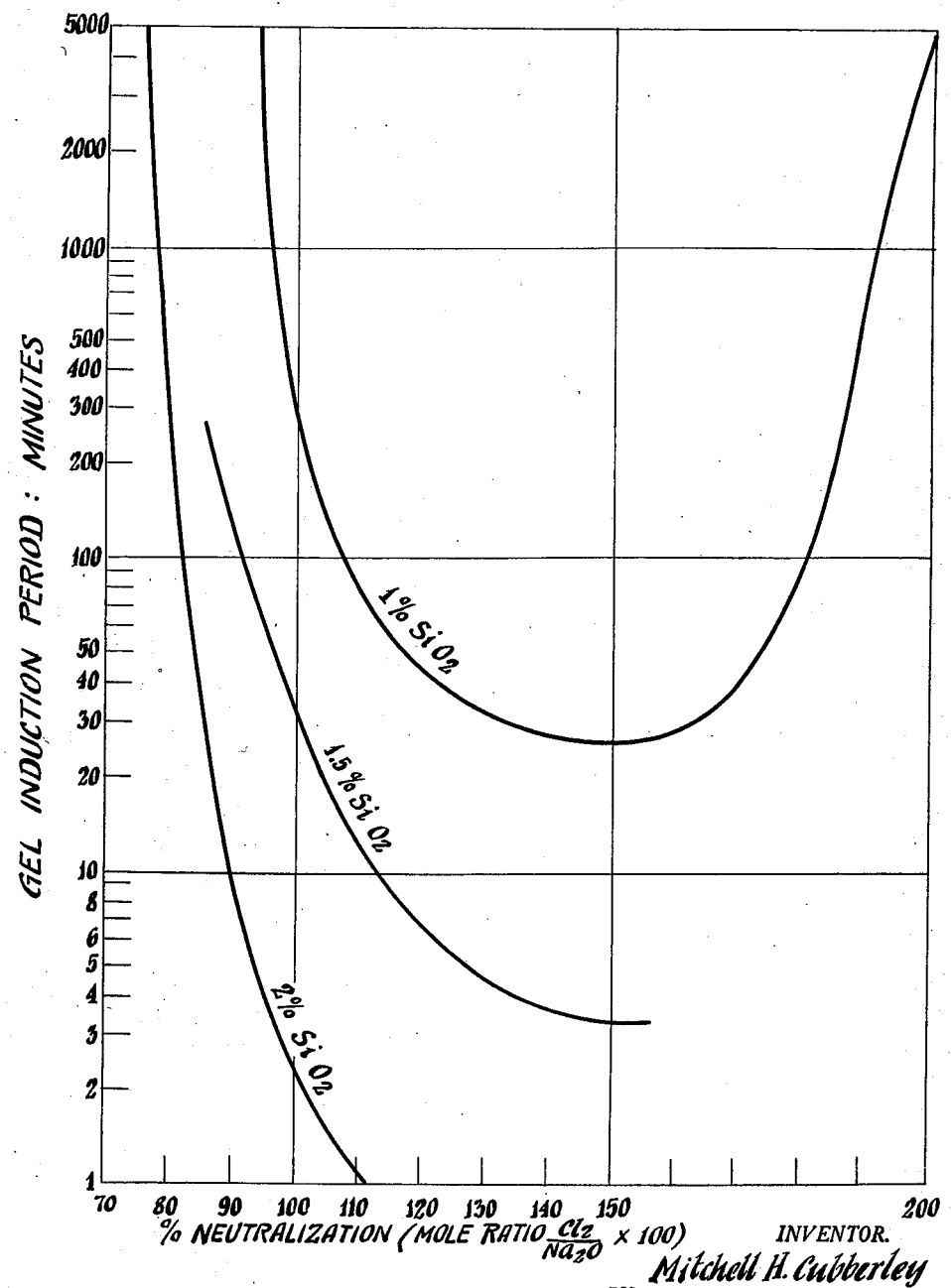

United States Patent Office 2,935,482
Patented May 3, 1960

2,935,482

APPARATUS FOR TREATING SODIUM SILICATE TO PRODUCE A SILICA SOL

Mitchell H. Cubberley, Belleville, N.J., assignor to Wallace & Tiernan Incorporated, a corporation of Delaware Application January 28, 1953, Serial No. 333,667

12 Claims. (Cl. 252—359)

This invention relates to procedure and apparatus for producing an aqueous product that is useful as a coagulation aid or for other purposes and that may be described as a silica sol in an aqueous medium. More specifically, the invention is directed to improvements in the preparation of such product by reaction of chlorine with sodium silicate in aqueous solution.

It has heretofore been found that by applying chlorine to an alkali metal silicate, preferably an aqueous solution of sodium silicate, the resulting neutralizing reaction produces in the solution a material that will sooner or later reach a state of gelation. If taken before actual or complete formation of a gel, i.e. so that the liquid is still abundantly fluid for convenience of use, the described, activated silica material constitutes a valuable coagulant or coagulation aid, for example in operations for clarifying, sterilizing, softening or otherwise processing raw waters, such as a water that has undesirable turbidity or like contamination when received for a water supply system, and for similar treatment of waste waters, whether for clarification or for recovery of valuable solids.

According to present understanding, the aqueous silica material immediately resulting from reaction of chlorine and sodium silicate in an aqueous medium, is in the state of a so-called sol, and may be regarded as a transition product hovering somewhere between the original state of solution and the final state of gelation. The period of transition starts with the introduction, for example, of chlorine into the silicate solution and ends, for practical purposes here contemplated, when the product is gelled to the point where it can no longer be handled as a liquid. This transition period comprises an appreciable length of the time and is conveniently defined as the gel induction period, varying with circumstances as explained below. For optimum utility, e.g. as a coagulation aid to promote coagulation and settling of solid particles in water to be treated, the sol should be employed at some point in the gel induction period; that is to say, there should be some aging, so to speak, of the chlorine and silicate mixture, yet the transition should not have progressed to the point of complete gelation where the material will not flow freely like a liquid.

It will be understood that in use for enhancing coagulation in turbid raw water or the like, the aqueous sol-containing product is added in small quantities to the water under treatment, but nevertheless such addition is only feasible in a practical sense if the sol-containing material is in a fluid state. Large dilution of the sol-containing product retards progress toward gelation, indeed essentially arrests it in a practical sense, so that such dilution may be employed where it is necessary to store the product, even for a short time, before use. Indeed, even where the product is continuously utilized, e.g. as fast as it is prepared, dilution during travel from the preparation zone to the locality of application has now been found desirable, to maintain the sol in a controlled, uniform condition. It may be explained that the duration of the gel induction period, in general, increases with increasing dilution, and also decreases with increase in ratios of chlorine to sodium silicate, i.e. up to a ratio of about 1.5 mols of chlorine to one mol of NaO.

One particular difficulty in making products of the character described, either for coagulation aids or for other purposes, is in controlling the transition in a desirably uniform manner, so that all parts of the liquid have arrived at more or less the same degree or state of gel induction, short of actual gelation. Not only is it desirable to achieve such homogeneity for the sake of uniformity in results of the use of the material and for economy of reagents, but it is especially important to avoid localized gelation such as tends to form rapid deposits on vessels and conduits, with corresponding need for frequent cleaning.

Although the present invention is not dependent on any given scientific theory, it is at present believed that the mechanism of gel induction is a growth in the size of colloidal silica particles (which result from the above reaction and which are called micelles) until the interlock and form a wet gel. As indicated above, it is desired for the present products, that such growth progresses to some extent but not to the point of complete gelation, control at a desired condition being attained, if necessary, by mixture with diluent water, to take advantage of the retarding effect of dilution. As also indicated, the efficacy of the sol as a coagulant aid appears to be related to micelle size, and in general increases with increase of such size.

For practical results, a certain state of dilution is necessary in the initial contact of the reagents in order to provide a gel induction period of convenient duration, e.g. even before the further dilution (if utilized) that is relied upon to interrupt micelle growth. Thus it has heretofore been proposed, as greatly preferable, that a rather dilute sodium silicate solution be treated with chlorine gas, the theory being that as the reaction occurs the end of gel induction will not be reached for at least an appreciable though short time. Thus in one prior process commercial sodium silicate solutions of concentrated character, containing from 25% to 30% $SiO_2$, are diluted with water to a concentration of not more than a few percent $SiO_2$, and then treated with chlorine gas in a mixing and aging chamber. The intent of the process is that the mixture, after aging, be withdrawn from the chamber and utilized before undesirable gelation has commenced, eg. in any part of the body of liquid.

In accordance with the present invention, it has now been discovered that remarkably improved results, as in uniformity and efficacy of the product, convenience of operation, reliability of control, and the like, are attained by introducing a sodium silicate solution into a previously prepared aqueous solution of chlorine, specifically a solution containing at least about 3500 parts per million (by weight) of chlorine. That is to say, instead of treating the sodium silicate solution, e.g. in diluted form, with chlorine gas, the chlorine, or at least most of it, is supplied in the form of chlorine solution; the chlorine is thus added to a considerable amount of water (herein sometimes called the primary dilution water) before the latter is mixed with the sodium silicate. A critically important feature of the improved process, however, is that the chlorine concentration of the water be relatively high, indeed usually much more than the minimum of 3500 p.p.m. mentioned above, and in any event considerably greater than would be produced, for example, in the discharge or tail pipe of a conventional vacuum-type chlorinator which is used for treating water with its produced chlorine solution and which yields a continuous flow of such solution (by aspirator-type injection of the gas) containing 500 to 1000 p.p.m. and seldom, if ever, as high as 3000 p.p.m.

As will be explained in more detail below, the present process utilizing chlorine solution of at least the stated value enables the practical attainment of much shorter gel induction periods than heretofore feasible and permits the use of small and compact equipment that is far easier to manage and care for. An additional but important feature of the invention is that the silicate solution can be employed directly as received from the manufacturer, e.g. in the usual concentrated form; indeed the treatment of concentrated silicate solution with the described chlorine solution constitutes a remarkably effective mode of performing the process for controlled attainment of very short gel induction periods.

A further and specifically important feature of the invention is the operation of the improved procedure as a continuous process, whereby a continuous, yet well controlled yield of activated product is obtained in apparatus of eminently satisfactory character.

With the present process it has been found that a markedly better silica sol material is produced, e.g. in relation to the amount of reagents (both silicate and chlorine) employed, and especially in that a more efficacious coagulant aid results. The process may be effectively and accurately controlled by control of reagent supply, yet remarkable uniformity of the product is achieved over indefinite periods of time (i.e. uniformity between successively discharged portions of product), and likewise an apparently much higher uniformity of degree of gel induction in any given portion of the discharged liquid.

Although the invention is not dependent on any specific theory, it is believed to afford a much greater uniformity of micelle growth after reaction between chlorine and silicate. Thus in the prior type of operation, especially where sodium silicate solution and water are first mixed to provide a dilute homogeneous solution, the progressive introduction of chlorine gas produces local variations in character and extent of reaction, with the result of overchlorination of some particles or portions of the silicate. As a result such over-chlorinated particles are understood to constitute micelles which grow extremely rapidly toward the point of gelation. At the same time other silicate particles or portions are relatively under-chlorinated, presumably yielding micelles which are small and grow only slowly in their immediate environment of dilution. In consequence the resulting sol consists of a mixture of micelles varying from very large to very small, and since the sol must be used before the largest micelles gel, the average micelle size obtainable in a properly liquid product is apt to be lower than might be desired.

In contrast, the specific, reverse type of operation in the present process has proved much superior. Here the chlorine (in a concentration specified above) is first dissolved and thoroughly mixed in the dilution water, and silicate solution is then added. The inevitable local variations occur (i.e. in localized variation of proportion of chlorine to silicate), but any particle of silicate which becomes over-chlorinated is also, in effect, over-diluted in the same proportion. Thus according to present understanding, the tendency of any transiently excessive proportion of chlorine to silica (existing at the locality of a number of the silicate particles) to shorten the gel induction period is in appreciable measure balanced by the tendency of the excess water (necessarily present with the chlorine) to lengthen such period, so that the ultimate difference in size between the largest and smallest micelles of silica is considerably less than in the prior process described above. In consequence, the average micelle size is substantially greater in relation to the maximum, i.e. largest micelles present; or in other words, growth may be permitted to a point where a considerably larger average micelle size is achieved. In any event, the product is found in fact to be markedly more efficacious, or more economical, in use as a coagulation aid.

Although the term gel induction period has been variously measured, it may be herein taken to be terminated when a detectable part of the body under examination will not flow as a liquid. For instance, if upon rapidly tilting the vessel and returning it to vertical, the first traces of gel formation are seen along the sides as the solution flows back, the gel induction period is deemed to be ended. It has heretofore been indicated that a sol aged for a period from one to 95 percent of its gel induction period is useful. In practice, it is usually preferable to age for at least two percent of the induction period and seldom necessary to age for more than about 25 percent. With the improved process, the conditions can be readily selected to afford an induction time which will best or conveniently suit the required rate of delivery and extent of aging, of the product. In any event, a special advantage of the present invention is in permitting ready attainment of short induction periods; hence a more effective product can be achieved in a given time (i.e. an aging period equal to a higher percent of the induction period) and the mixing vessel may be relatively small in view of the attainment of a sufficient extent of aging with relatively short retention time.

In the above fashion and by its improved control, the present process affords practicable attainment of shorter induction periods, and as stated, the apparatus, particularly for continuous operation, may be unusually small in size for a relatively large rate of discharge of effective coagulant aid. Likewise incrustation of gel, manifested by deposit of solid or solidifying material on various parts and plugging or choking of conduits or the like, is greatly reduced and indeed minimized. A further consequence of these effects and results is that the apparatus is easier to clean and maintain. Indeed the small size of apparatus which the process permits is of tremendous advantage; some periodic cleaning is usually necessary (even though incrustation is greatly reduced), and for most commercial purposes the mixing vessel for this procedure can be small enough to be held with one hand while it is brushed out, as distinguished from the large tanks heretofore used.

It will be understood that some variation of proportions and concentrations of reactants is possible, for attainment of a useful sol by the present process. Thus it appears, for example, that a very desirable criterion is a suitably short gel induction period, usually not more than about 100 minutes and preferably less.

Sodium silicate solution, for example, is available in a wide variety of grades, differing in concentration and also in formula, which may be expressed approximately as to the content of $Na_2O$ and $SiO_2$, for example $$Na_2O(SiO_2)_x$$

The value of $x$ can be any amount (not necessarily a whole number) upwards of 1 to about 4, and for convenience may be designated herein as the silica ratio, in effect measuring the proportion of $SiO_2$ to $Na_2O$. For economic reasons one grade of sodium silicate (called grade N) which has been found advantageous for the present process has the following approximate composition:

| | Percent |
|---|---|
| $Na_2O$ | 8.9 |
| $SiO_2$ | 28.7 |
| Water | 62.4 |

The silica ratio of this concentrated solution is about 3.3, it being generally desirable that the ratio be substantially greater than 1, e.g. at least about 1.6 and preferably 2.4 or higher, for the purposes of the present process. Within limitations of cost of this reactant, the higher the silica ratio, the more efficient and economical will be the results of the reaction.

Utilizing the above 28.7% $SiO_2$ silicate, a gel induction period of approximately 100 minutes is achieved upon adding the silicate solution to water containing about 4000 p.p.m. of chlorine, in proportion to yield a mixture having a concentration of 1% $SiO_2$. In such case the process provides, so to speak, about 107% neutralization of the sodium silicate. The degree of neutralization may be defined as the ratio of chlorine to $Na_2O$, a one mol. to one mol. ratio being considered 100%. Concentrations of silicate solution and of ultimate mixing chamber product are conveniently herein expressed as percentage of silica, i.e. in the composition under consideration.

In general, for attainment of a gel induction period not longer than a given value (and in a mixture which will have a given, ultimate concentration of $SiO_2$—for example, selected in the range of 1% to 2% or so), the concentration of chlorine required in the water in which it is dissolved varies somewhat inversely with the ratio of $SiO_2$ to $Na_2O$ in the sodium silicate solution supplied. This relation may be affected by the $SiO_2$ content of the silicate solution. The chlorine concentration will have to be higher (for a given result) when the percent $SiO_2$ is less in the supplied silicate, inasmuch as the supplied silicate then contributes more dilution to the ultimate mixture. However, for a given result of gel induction period at a given ultimate content of $SiO_2$ in the mixture, the concentration of chlorine expressed as percentage of the total mixture appears to bear a relation to the silica ratio of the supplied silicate, i.e. increasing with decrease of silica ratio.

It is also apparent that for any given silica content in the final mixture, the gel induction period decreases with increase of percent neutralization, at least up to about 150% neutralization, which means a mol ratio of chlorine to $Na_2O$ of 1.5. Hence with all other factors unchanged, the induction period will decrease with increase of chlorine concentration in the water in which it is dissolved. Moreover, in order to obtain a given gel induction period, the percent neutralization required is less as the silica content of the ultimate mixture is raised. That is to say, the total amount of chlorine needed then becomes less (i.e. at higher ultimate silica concentrations); yet in order to take advantage of the lower percent neutralization required for a product that is less dilute (with respect to $SiO_2$), the concentration of chlorine in the primary dilution water may have to be greater.

For instance, using the silicate described above ($SiO_2$ content 28.7% and silica ratio of 3.3), it has been found that an induction period of 100 minutes is achieved with the following conditions at the selected, ultimate silica concentrations of 1%, 1½% and 2% respectively:

| Percent $SiO_2$ | Percent Neutralization | P.p.m. $Cl_2$ in Cl solution | P.p.m. $Cl_2$ in mixture |
|---|---|---|---|
| 1% | 107 | 4,000 | 3,800 |
| 1½% | 91 | 5,200 | 4,900 |
| 2% | 82 | 6,300 | 5,800 |

On the other hand, for a 4 minute gel induction period with the same silicate solution, the following conditions prevail:

| Percent $SiO_2$ | Percent Neutralization | P.p.m. $Cl_2$ in Cl solution | P.p.m. $Cl_2$ in mixture |
|---|---|---|---|
| 1½% | 136 | 7,700 | 7,800 |
| 2% | 95 | 7,300 | 6,700 |

A gel induction period as short as 4 minutes cannot be reached where the ultimate silica concentration in the mixture is only 1%. According to present investigations the minimum attainable induction period decreases with increase of percent $SiO_2$. For example the minimum is about 25 minutes at 1% $SiO_2$ and 150% neutralization; at 1.5% $SiO_2$, periods less than 4 minutes can be reached, and much shorter periods (if desired) at 2% $SiO_2$. The manner in which the gel induction time varies with percentage of neutralization, for various $SiO_2$ concentrations, is shown in Fig. 8 as described below. In general, each such curve slopes steeply downward (from large values of induction period) as the percent neutralization is increased from values below and through 100%, and flattens out to reach or approach a minimum in the vicinity of 150% neutralization; such minima are lower for curves of higher percent $SiO_2$.

Various grades of sodium silicate solution may be used. For instance, the following data illustrate the attainment of a gel induction period of about 100 minutes at an ultimate $SiO_2$ concentration of 1% (and neutralization in the vicinity of 100%), respectively with grades identified as S-Special and B, S-Special having a silica ratio of 3.75 and containing 25.3% $SiO_2$ and 68% water, and B having a silica ratio of 1.6 and a content of 38.7% $SiO_2$ and 37.1% water:

| Grade | P.p.m. $Cl_2$ in Cl solution | P.p.m. $Cl_2$ in mixture |
|---|---|---|
| S-Special | 3,400 | 3,300 |
| B | 7,900 | 7,700 |

Whereas all of the above examples of sodium silicate solutions (including so-called N grade) are regarded as of desirably high concentration for purposes of the improved process, the advantages of good control and reasonably short induction time may be obtained with silicate solutions of lower $SiO_2$ content. Thus for some purposes a solution having 10% $SiO_2$ may be quite useful, although special advantages seem to reside in utilizing solutions of at least about 20% $SiO_2$. Although some basic advantages of the present process can be realized even with very dilute silicate solutions, it is preferred that as much as possible of the water for the ultimate mixture be embraced in the chlorine solution rather than the silicate. Indeed a special advantage of the invention is that it permits the direct use, in a fully controlled way, of sodium silicate of the most siliceous and most concentrated grades that can be handled as a liquid.

While the attainment of gel induction periods of 100 minutes or less represent a special feature of the invention and while periods in the range of 10 minutes to 50 minutes are particularly advantageous, there may be situations where longer times can be tolerated. Thus, for example, the following data represent various sets of conditions for reaching a gel induction period of 200 minutes (the neutralization being in the vicinity of 100% for the products of 1% $SiO_2$, and in the vicinity of 80% or so where the higher $SiO_2$ concentrations are reached):

| Silicate Grade | Percent $SiO_2$ | P.p.m. $Cl_2$ in Cl solution | P.p.m. $Cl_2$ in mixture |
|---|---|---|---|
| N | 1 | 3,800 | 3,600 |
| N | 1½ | 5,000 | 4,600 |
| N | 2 | 6,200 | 5,700 |
| S-Special | 1 | 3,300 | 3,100 |
| B | 1 | 7,600 | 7,300 |

For most purposes of the invention the concentration of chlorine in the dilution water should be high enough to provide the desired gel induction period. The theoretical maximum solubility of chlorine in water at atmospheric pressure is approximately 10,000 p.p.m. at 50° F. When operating in actual practice, with various water temperatures and with means such as the presently preferred apparatus described below, it appears that concentrations of 6000 to 8000 p.p.m. are about the maximum to be expected. However, if pressure substantially above atmospheric can be used, more concentrated chlorine solutions may be available.

In any given case, the concentrations and proportions of reagents (or their components) are selected to provide the desired gel induction period, which in the present invention is primarily determined by percent neutralization and percent $SiO_2$ in the resulting sol-containing mixture. These factors (neutralization and $SiO_2$ content) are not only interrelated and manifestly dependent, in any actual operation, on the relative proportion of chlorine solution and silicate solution, but they are basically governed by the silica ratio of the silicate used, the chlorine concentration of the water, and to some extent by the $SiO_2$ content of the silicate. The manner in which the last-mentioned factors are related to the desired results, has been explained above, so that there should be no difficulty in the selection of actual values to be used in the given case.

Although a primary object of the invention is, as indicated above, to provide improved procedure for making a silica sol of the described character, another object is to afford improved equipment for such operations, and specifically to provide small, flexible, economical and dependable apparatus for the continuous production of such material in useful liquid form. Indeed it will be understood that the apparatus or significant features of it, may have utility outside the scope of the improved process itself, for example for effectuating neutralization of silicate solutions to the state of a sol under conditions or in concentrations or proportions where the special advantages of the new process may be required.

To these and other ends the accompanying drawings include illustration of certain examples of apparatus useful for the continuous production of the silica sol.

In the drawings:

Fig. 1 is a diagrammatic view, with certain elements in simplified vertical section, of one system according to the invention;

Fig. 2 is an enlarged fragmentary detail view, partly in central vertical section, of the upper part of a mixing chamber suitable for Fig. 1;

Fig. 3 is a further enlarged fragmentary detail, in section on line 3—3 of Fig. 2, showing an ejector device for the mixing chamber;

Fig. 4 is a simplified perspective view of the mixing chamber vessel, partly broken away;

Fig. 5 is a detail view showing a modification of the mixing chamber arrangement in Fig. 1;

Fig. 6 is a diagrammatic view, showing certain principal parts of a system embodying other modifications relative to Fig. 1;

Fig. 7 is a simplified, chiefly diagrammatic view of another system for production of the described sol product; and Fig. 8 is a graph to illustrate the manner in which gel induction time varies with percent neutralization.

Referring first to Fig. 1, and also for details to Figs. 2, 3 and 4, the illustrated example of apparatus comprises a chlorine supply and metering device 10, which delivers chlorine gas to a dissolver 11 that in turn supplies aqueous chlorine solution to a mixing and aging chamber 12. Concentrated sodium silicate solution contained in a suitable tank 14 is also delivered by a pump 15 through a pipe 16 to the chamber 12. Water for making up the chlorine solution is supplied to the dissolver 11 through a pipe 17 from a supply pipe 18 which receives a sufficient water flow under considerable pressure. The aqueous silica sol product manufactured in the chamber 12 is withdrawn and diluted, for discharge through a pipe 20, as by a special device described below. The supply of concentrated silicate solution is appropriately controlled, and adjustment of chlorine solution feed is effected through control of the chlorine gas flow and of the water supply, all by means to be presently described. The stated combination is thus effectively adapted for the continuous process whereby concentrated silicate is introduced into an aqueous chlorine solution which provides the primary or initial dilution for convenience of reaction and which may have a high chlorine content to yield a highly effective sol having a short gel induction period. The sol is delivered, with considerable further dilution, in the discharge line 20.

Although alternative apparatus embodying chlorine and water feed at high pressures may be used, the effective system of Fig. 1 is of vacuum type, in that the mixing chamber 12 is maintained under sub-atmospheric pressure (e.g. a pressure departing below atmospheric by an amount up to 20 inches or so of water) and various operations, including the feed of chlorine gas, are effected under such negative pressure. Thus one suitable instrumentality 10 for metered flow of chlorine is similar to the metering portion of a so-called vacuum-type chlorinator. This device comprises a bell jar 21 having its lower edge sealed by water in a surrounding tray 22 wherein water is maintained at a constant level by suitable supply inlet 23 and an overflow pipe 24. Under the bell jar 21 the water may rise, by communication from the tray 22, to a level 25 dependent on the pressure under the jar. Chlorine gas from a suitable source at high pressure, such as a commercial tank (not shown), is received via a tube 27, which opens into the bell jar 21 through a float-controlled reducing valve 28 such as to maintain an essentially constant predetermined pressure under the jar, for example a negative pressure of 2 inches of water, represented by the level 25.

Through a so-called metering tube 30 projecting into the jar 21 and having a calibrated metering orifice 32, the chlorine gas may be withdrawn into a discharge line 34—35. Upon applying appropriate suction downstream of the conduit system which includes the line 35, chlorine gas may be withdrawn at a rate controllable solely by the pressure in the line 35, i.e. downstream of the fixed metering orifice 32, since the pressure upstream of such orifice is kept constant by the valve 28. The portion 34 of the chlorine outlet tube may be arranged within the metering tube 30 to draw water up in the latter under the downstream pressure and thereby provide a water manometer responsive to the pressure difference across the orifice 32, for indicating the rate of chlorine feed on a scale 37. To avoid undesirable collection of water condensate in the line 35, a drain tube 38 may lead from the latter to a suitable trap chamber 40. If desired, auxiliary means (not here shown, but conventional in chlorinators) may be included to substitute air for chlorine should the supply of the latter be exhausted, and also to permit suitable relief of chlorine from the bell jar 21 should the pressure there rise excessively by any derangement of the apparatus.

Instead of drawing the chlorine into water by an aspirator-type injector which is conventional in chlorinators but which cannot produce solutions having as much as 3500 p.p.m. chlorine, the illustrated system utilizes an unusually efficient device 11 which may be defined as a jet-action chlorine dissolver. This device comprises a solution chamber 41 having a cylindrical wall 42 of transparent plastic, glass or the like and having a head structure 43 including a passage 44 through which chlorine gas may travel from the line 35 into the chamber. Suspended in spaced relation within the chamber, an open topped vessel 46 is provided, preferably of considerable vertical height as shown although in some instances a shallow dish may be substituted.

A jet of water is continuously projected directly downward into the vessel 46 through a jet opening 48 in the head 43, the jet passage 48 having, at its entering side, a movable valve element 49 arranged for control of water flow through the jet. Cooperating elements of the valve include a chamber 50 through which the water passes to the opening 48, and a stem portion 51 of the valve element 49 threaded for rotative adjustment and extending through suitable packing 52. Thus by turning the handle 53 at the outer end of the stem 51, the valve element may be moved into and away from the seat constituted by the jet opening 48, for adjusting the rate of water flow into the vessel 46.

Water under pressure is admitted to the jet supply chamber 50 from the line 17 through passage means 56 in the head 43, including a calibrated orifice 57. A suitable U-tube mercury manometer 58 has its legs respectively communicating with the passage means 56 at opposite sides of the orifice 57, to provide quantitative indication of the water flow into and through the jet.

The water supplied in the line 18 passes through a strainer 59 of conventional type and is reduced somewhat in pressure by the adjustable reducing valve 60, i.e. to a selected, constant value indicated by the gauge 61, so that as the water then traverses the pipe 17 and the fixed orifice 57, effective control of the rate of water flow, e.g. in volume per unit time, may be achieved by the valve 49.

The vessel 46, in chamber 41, is kept filled with water, and as the jet from the opening 48 strikes the water in the vessel a great turbulence is continuously produced, with simultaneous and continuing overflow from the vessel, in a correspondingly turbulent fashion. By such turbulence in the vessel and in its overflow around the top edge and by the downward flow of the water through the chamber 42 in more or less turbulent and broken streams and drops around the vessel, chlorine gas is entrained in the water and caused to dissolve there, in unusually large amount. A vertical column 65 extends downwardly from the bottom of the solution chamber 41, into the mixing chamber 12, and opens, in the present device, at a locality near the bottom of chamber 12. The chlorine-containing water which falls through the chamber 41 thus continues to fall downwardly through the column 65, the latter being of sufficiently wide cross-section so that it does not fill with water to any level and so that air (introduced as explained below) and any residual chlorine gas may bubble out from the bottom of the column in the chamber device 12.

The mixing chamber 12 comprises an upright cylindrical vessel, conveniently of transparent plastic or the like, closed at its top by a block-like head 67 through which the column 65 enters. In use, the chamber is kept filled with liquid to a suitable upper level 68. The pipe or tube 16 supplying concentrated sodium silicate solution enters the chamber 12 through appropriate conduit structure 69 traversing the head 67 and opening below the liquid level 68. The silicate solution is continuously withdrawn from the tank 14 and thus delivered into the chamber 12 by a pump 15, which may be of any accurately controllable and preferably volumetric type, for example a diaphragm pump as shown having the usual check valves and suitable means 70 for varying its delivery (as by adjusting the length of stroke) and for providing visible designation of the rate of feed of silicate solution. It will be understood that although the advance of liquid with the diaphragm pump 15 is actually by successive pulses, delivery in such continuously repeated fashion is intended to be embraced by the above general reference to continuous supply of silicate solution.

For withdrawal of the produced sol-containing mixture and for simultaneous creation of the necessary vacuum or negative pressure to effectuate the controlled feed of chlorine gas a special ejector device 72 is provided. As shown in enlarged detail in Fig. 3 this device includes an upwardly facing ejector nozzle 73, disposed within the chamber 12 at an upper part, and a tailway pipe 74 projecting downwardly through the chamber head 67 and carrying, a short distance above the small opening of nozzle 73, a tailway orifice structure 75 that has an inlet opening of reduced size, but larger than the opening of nozzle 73. The ejector nozzle 73 is mounted at the end of a curved or U-shaped tube 76, which communicates with a passage 78 in the head block 67. The passage 78 is connected with a water supply pipe 79, which receives a considerable flow of water, through a strainer 80 of conventional type; thus a vigorous jet of water is projected from the nozzle 73 into the tailway inlet 75, and carries with it a continuing flow of the liquid (with some gas) in the chamber. The tailway duct 74 continues on in the form of the pipe 20 (Fig. 1) through which the diluted product may be led to a desired locality of use, for example for introduction into a stream or other body of water (not shown) where coagulation of turbidity or the like is to be induced.

As shown, the opening of the ejector nozzle 73 and the opening of the tailway device 75 face each other in vertical alignment, being separated by a small distance, for instance about ¼ inch. For maintenance of these parts in the selected spacing and alignment, the other leg of the U-shaped ejector pipe 76 rigidly carries a horizontal alignment plate 83, which has a circular opening 84 into which a corresponding cylindrical portion of the tailway member 75 is fitted, with a shoulder 85 of the latter member abutting the upper surface of the plate 83. The ejector pipe 76 is maintained in position in the head 67 by a flanged collar 87 threaded on it and seated in and against the lower part of the head 67, with a reduced upper extension 88 of the pipe clamped against the upper face of the head 67 by a nut 89. The tailway pipe 74 is maintained in place with its member 75 seated in and against the plate 83, by a bushing-like clamping nut 90 threaded into the head 67 around the pipe 74 and compressing a gasket 91 against the pipe.

By the described ejector structure, water under pressure is delivered at high velocity and considerable volume through the ejector nozzle and thence directly into the tail way opening and on through the pipes 74 and 20. In traversing the structure 73, 75, the latter functions similarly to an aspirator or vacuum-type ejector, i.e. like a constricted passage having lateral openings, with the production of a low pressure at the region between the nozzle and the tailway, to suck liquid and gas into the stream and on through the tailway.

In consequence of the ejector action the pressure in the mixing chamber 12 is maintained at a substantial sub-atmospheric value, the liquid level 68 having a position thus determined by the ejector structure, e.g. close at or just below the tailway opening in the member 75. By virtue of the vacuum thus induced in the upper part of the chamber 12, and having a value (measured in inches of water) considerably greater, in the negative sense, than the height of submergence of the column 65 below the level 68, a vacuum or negative pressure is likewise maintained within the column 65. Such negative pressure thus causes chlorine gas to flow through the line 35 from the metering means 10 and into the solution chamber 41.

For regulation of the flow of chlorine gas, one suitable means may comprise a vacuum regulating valve 94, consisting of a chamber 95 closed by a diaphragm 96 carrying a valve element 97 which tends to close an air inlet opening 98 when the pressure in the chamber 95 rises relative to the atmospheric pressure on the outer face of the diaphragm. The diaphragm is urged outwardly, against the air pressure, by a tension spring 99 connected to a knob device 100 for adjusting its tension. The chamber 95 communicates with the conduit 65, conveniently at a locality between the chambers 11 and 12, through a pipe 102. By this means air may be continuously bled into the column 65, to maintain there a constant, sub-atmospheric pressure, determined in value by the adjustment of the knob 100 of the regulating value 94. For example, if the pressure in column 65, and thus in the chamber 95, tends to rise above a value corresponding to the setting of the knob 100, the valve 97 is drawn inward by the diaphragm, decreasing the inward flow of air and allowing the pressure to fall appropriately. If the pressure in column 65 becomes too negative, reverse operation of the control valve 94 occurs, increasing the flow of air. In this fashion the negative pressure in the column 65 is maintained at a specific, determinable value, which is smaller in a negative sense (i.e. a lower vacuum) than the value which tends to be produced there by the function of the ejector. The flow of chlorine gas can be controlled by the setting of the knob 100 which, as now explained, governs the pressure in the gas flow system downstream of the metering orifice 32.

Any undesirable condensate or other collection of water can be removed from the line 102 by a suitable drain pipe 104 leading to the trap tank 40.

The mixing and aging chamber 12 also includes a vertical baffle 106, which separates the silicate inlet 69 (and also the chlorine solution inlet 65) from the ejector device 72, and which can be simply a piece of thin, stiffly flexible plastic material sprung into place across the chamber 12 with space, as at the cut-off lower corners 108, for liquid communication at the bottom. The baffle projects above the liquid level, but does not divide the space over the liquid. Although satisfactory results are obtainable without the baffle, the latter provides a somewhat longer path for the more or less continuous travel of mixed chlorine solution and silicate, especially in the more quiet, aging portion of the chamber at the right-hand side of the baffle in Fig. 1, whereby greater uniformity of micelle size is obtained in the product reaching the ejector.

Although other arrangements can be used, the mixing and aging chamber very preferably has all its conduit structures entering through the head 67 so that the vessel 12 may be readily removed for cleaning from time to time. As shown purely for example in Fig. 2, the connection of the vessel to the head or cover 67 may be effected with quick-disconnecting means, to facilitate removal. Thus a ring-shaped casting 110 is secured on the head 67 and has a pair of oppositely projecting slot lugs 111, into which a corresponding pair of bolts 112 may be swung, the bolts being respectively pivoted to diametrically opposed pairs of lugs 114 at the exterior of a ring 116 which is engageable with an annular flange 117 near the top of the vessel 12. With the parts in position as shown in Fig. 2, the wing nuts 118 may be tightened down on the bolts 112 against the slot lugs 111, so that the ring 116 pulls the upper edge of the vessel in tight sealing engagement with a gasket 119 in a suitable annular recess 120 of the head 67. To release and remove the vessel it is only necessary to loosen the wing nuts and swing the bolts 112 outward. The upper casting 110 carries the head 67 and can have appropriate supporting structure (not shown) for attachment to a fixed support.

The operation of the apparatus will now be readily apparent. With the constant-pressure valve 60 set to show a suitable pressure on the gauge 61, water is supplied continuously through the line 18—17, its flow being adjusted by the valve 49 to a desired value as indicated on the manometer 58. The vessels 46 and 12 being filled with water, the ejector 72 is also set in operation by supply of water through the pipe 79, and under the resulting vacuum the chlorine gas is fed by the metering device 10 at a rate indicated on the scale 37, e.g. as adjusted by the valve 94. Concentrated sodium silicate solution is also continuously supplied by the diaphragm pump 15, at a measured rate.

From the jet-action chlorine dissolver 11 chlorine solution continuously falls to the bottom of the column 65, there accompanied by some air and usually some small remainder of chlorine gas which is essentially promptly dissolved in the vessel 12. The air is chiefly supplied by the valve 97, although some slight amount of air may be released from the water in the device 11 as chlorine is there absorbed. In order to insure both the feed of air and the availability of a range of chlorine flow, the ejector should tend to produce a pressure in column 65 which is more negative, e.g. by at least a few inches of water, than the most negative pressure required there, i.e. for maximum chlorine flow. As the air bubbles up from the column 65 in the vessel 12, it effects desirable agitation of the liquid, for good mixing of the silicate and chlorine solution, e.g. preferably only in the left-hand part (Fig. 1) of the divided vessel.

Thus in the chamber 12 the desired neutralization and activation reaction occur, enhanced in uniformity by the agitation, and the sol-forming mixture travels more or less continuously under the baffle 106 and upwardly (while aging) in the right-hand side of the chamber to the ejector device 72. The latter continuously draws off a more or less constant flow of the sol product, which at this point is in the desired state of incipient gel formation. In the tailpipe 74–20, the sol is much diluted by the ejector water, so as to arrest or at least greatly retard actual gelation, while yielding a product fully satisfactory for coagulation aid or like purposes. Since the ejector 72 cannot withdraw liquid appreciably below a level in the narrow band between the openings of the parts 73, 75, the discharge of aqueous sol from the chamber 12 is automatically maintained at the same rate as the total supply of liquid to the chamber; in consequence the actual rate of delivery of neutralized silicate in the outlet 20 is accurately controlled by control of the supply of silicate solution and primary dilution water through the pump 15 and throttle valve 49. Although other means may be employed for obtaining a high concentration of chlorine in the primary dilution water (such as a so-called fog nozzle or the like) the jet-action dissolver 11 is unusually efficient and requires relatively little energy.

The ejector 72 serves a four-fold function, i.e. to extract the product, to dilute it as extracted, and to afford suction not only for feeding chlorine gas but also for intake of the air which provides agitation in the mixing chamber and satisfies the excess negative pressure demand, so to speak, transmitted to the column 65 from the ejector.

Although in following the procedure of this invention there is much less actual gel formation (without sacrifice of the desired extent of aging) than in prior practice, and consequently much less tendency for deposits to collect and solidify at various surfaces exposed to the undiluted sol-containing liquid, the apparatus is preferably designed, as shown, to facilitate the necessary cleaning of all such surfaces from time to time. The ejector device is unusually free of clogging trouble since the rush of water from the lower nozzle 73 keeps the latter clean, and the only liquid entering the upper orifice part 75 is highly diluted, so that there is practically no tendency for silica to deposit. While mechanical agitation can sometimes be employed, the air agitation avoids troublesome solid accumulations on mechanical agitator blades. Finally, the entire apparatus may be unusually small and compact, especially when employed for the described procedure whereby a relatively high concentration of neutralized and effectively aged $SiO_2$ may be rapidly achieved.

By way of specific example, the silicate solution supplied from the tank 14 may be of a grade and concentration mentioned above, e.g. having 28.7% $SiO_2$ and 8.9% $Na_2O$. The flows of chlorine gas and dilution water are readily controllable to produce a chlorine solution in the dissolver 11 containing, say, 6000 p.p.m. at the rate of 0.64 gallon of solution per minute (the latter being measured as dilution water flow through the line 17). Under such circumstances, by feeding sodium silicate solution at the rate of 50 gallons per day, the sol produced in mixing chamber 12 will contain about 2% $SiO_2$ and will have a gel induction period of about 20 minutes. If mixing chamber 12 has conveniently small dimensions, such as an inside diameter of 5½ inches and a liquid depth of 11 inches, the sol will have been aged for about 8½% of its gel induction period when it reaches the ejector 72. Such a sol will be an extremely active coagulant aid and the quantities described in the example will be sufficient to dose 5 million gallons of water per day at the rate of about 4 parts of $SiO_2$ per million parts of water.

Fig. 5 shows one of various possible modifications of the mixing chamber 12, similarly numbered parts being identical with those in Fig. 1, as likewise other parts of the system not here shown. In Fig. 5 the air inlet tube 102 from the vacuum control valve 94 (Fig. 1) is separately directed into the chamber 12 via a tube 123, instead of entering the chlorine solution transfer column 65 at a point above the chamber. The tube 123 opens beneath the liquid, on the inlet side of the baffle 106 and preferably near the bottom of the chamber, and continuously releases air bubbles for the desired, moderate agitation. The valve 94 (Fig. 1) may function in the same manner, except that in a sense it more directly controls the vacuum at the head of the chamber 12; since the column 65 has a fixed length of submergence in the liquid, the valve can be used for adjustment of chlorine gas flow as in Fig. 1.

Fig. 6 shows other modifications in the system of Fig. 1, but with the same chlorine metering means 10 and dissolver 11 and identical arrangements (not shown) of the drain 38, and of the water and silicate supplies to the lines 17 and 16. Here, however, the chlorine solution supply column 125 from the dissolver 11 opens into the top of the mixing chamber 12 above the liquid level 68, and an air supply tube 126 extends into the chamber to open near the bottom, i.e. on the mixing or inlet side of the baffle 106. Although the air supply tube 126 may communicate with a pressure regulating valve of the sort shown at 94 in Fig. 1, it may alternatively simply open to the atmosphere as at 127. In the latter event, the tube 126 constitutes a simple automatic regulator, keeping the negative pressure (induced by ejector 72) in the top of the chamber at a value equal, in inches of water, to the submergence of the tube. Hence the mixing chamber should be so designed that the height of submergence of the tube 126 corresponds to the highest vaccum required in the column 125, i.e. for the largest desired value of chlorine flow.

The system of Fig. 6 also includes a chlorine flow control valve 128, providing an accurately adjustable orifice in the chlorine supply 35a—35b between the metering device 10 and the dissolver 11, so as to adjust chlorine flow by adjusting the pressure on the downstream side of the fixed metering orifice 32. Although this valve between the devices 10 and 11, or equivalent means, is necessary in Fig. 6 when the air tube 126 opens directly to the atmosphere, a like valve may also very advantageously be embodied at a corresponding locality in Fig. 1 or in Fig. 1 as modified by Fig. 5; in such cases, the regulating valve 94 may be pre-set (or pre-designed, without adjustability) to a relatively high value of vacuum in the column 65, and actual adjustment of chlorine flow can be accomplished by the added throttle valve in the chlorine line.

As indicated above, other metering and feeding devices may be employed, e.g. for chlorine gas and dilution water, and effective results may also be obtained with systems arranged to operate at high pressures rather than under vacuum. By way of example, Fig. 7 shows another form of system, useful for carrying out the process of the present invention. While many features or combinations in Fig. 7, including the compensator-type devices for metering the feed of chlorine and water, can sometimes be substituted for corresponding elements in Fig. 1, the arrangement of Fig. 7 is shown and described as for operation under a high pressure, i.e. a pressure considerably above atmospheric.

Thus in Fig. 7, two so-called compensators 130, 130a are shown, respectively for controlling the flow of chlorine gas and dilution water to the chlorine dissolver 131. Since the devices 130 and 130a may be functionally identical and include similar, variable orifice-type flow control valves 132, 132a, only the device 130 need be shown and described in detail. This instrumentality comprises means housing a pair of chambers 133, 134 separated by a diaphragm 135 which is urged toward the chamber 133 by a compression spring 136. The chambers communicate with each other through the adjustable throttle valve 132, whereby a pressure drop occurs as fluid, e.g. chlorine gas, entering chamber 133 via the pipe 137 passes through the valve 132 and then leaves the chamber 134 via the pipe 139. The diagram 135 carries a valve member 140 arranged to be moved by the diaphragm toward closed position of the fluid inlet 137 when the pressure difference between the chambers rises, and to move the valve toward open position when such pressure difference falls. In consequence a constant pressure difference is maintained between opposite sides of the diaphragm and thus across the valve 132. The size of the valve opening governs the rate of fluid flow, so that the latter may be controlled by adjusting the valve.

The outlet pipes 139, 139a of the respective chlorine and water supply compensators have appropriate manometers 142, 142a, e.g. across a suitable restrictive orifice as at 143, for reading the flow of each fluid. Although the chlorine dissolver 131 can be of other types such as a baffle chamber or the like (it being easier to obtain high chlorine concentrations at high pressures), it may be assumed, for illustration, that the device is like the jet-action dissolver 11 of Fig. 1, with appropriately high pressure in the gas supply line 139 to prevent liquid from rising above, say, the lower end of the vessel 46 (Fig. 1). The mixing and aging chamber 146 may also be somewhat similar to Fig. 1, with a baffle 148 to lengthen the path of flow. Assuming that the pressure in the chamber 146 is at least somewhat above atmospheric, the column or conduit 150 from the dissolver opens directly into the head of the chamber, to supply chlorine solution, with which the concentrated sodium silicate solution is mixed, i.e. as introduced through inlet 151 from the delivery pipe 16 of a suitable metered supply. Although air agitation can be used with special advantage, a simple blade-type mechanical agitator 152 is shown, driven by a motor 153.

The function of the system in making the activated, aqueous silica sol product is essentially the same as described above, namely by mixture of the concentrated silicate solution into the chlorine solution, the product being then discharged from another part of the chamber 146 either by a diluting-type discharge device (Fig. 1) or by a simple delivery tube 155 as shown in Fig. 7. For instance, direct outlet of the sol product may be feasible where it is immediately introduced into the body or stream of water to be treated (not shown). In Fig. 7 as in Fig. 1, the chlorine gas and primary dilution water are fed to the dissolver at measured, adjustable rates of flow, and the resulting, preferably concentrated chlorine solution flows continuously to the chamber 146, where it meets the controlled feed of sodium silicate solution for the neutralizing reaction. The mixture ages appropriately as it travels to the discharge pipe 155, to yield a satisfactory sol product.

Referring back more particularly to Figs. 1 to 6, it has been indicated that in practice some of the chlorine, e.g. up to 10–15% or so in certain cases, usually remains undissolved after traversing the jet-action device 11, and thus reaches the mixing pot or vessel 12 in gaseous form. A substantial majority of the chlorine, however (say 85% to 90% in Fig. 6), is dissolved in the water by the device 11, and the advantages of the invention are of course fully realized; indeed as explained above, substantial advantages are achieved in all cases of the process, i.e. wherever the device 11 delivers a solution containing at least about 3500 p.p.m. of chlorine. In the system of Fig. 6, a majority of the undissolved remainder of chlorine usually enters solution at the surface of the liquid in the vessel 12, although some is by-passed directly to the ejector 72. Indeed having an excess of chlorine which is thus by-passed is often desirable, e.g. in permitting large chlorine feed to insure very high solution concentration in the device 11 while avoiding over-chlorination due to gaseous excess in the vessel 12. In the systems of Figs. 1 and 5 a larger majority of the chlorine entering the mixing vessel is adsorbed there, but in all cases all of both the chlorine and the silicate eventually reaches the tailway of the ejector 72 and the ultimate degree of neutralization is governed only by the relative settings of the two feed rates. In the arrangement of Fig. 6, which is at present preferred, the exact degree of neutralization in the vessel 12 is determined more closely or precisely by the dissolved chlorine concentration delivered by the jet device 11.

Although the manner in which gel induction time varies with percent neutralization has been generally indicated above, Fig. 8 provides further illustration in the form of specific curves, each representing a series of approximate values of induction period and percentage neutralization, for a given $SiO_2$ concentration in the reacting mixture. As shown, induction periods are plotted as ordinates and percentages of neutralization as abscissas; although only three curves are given, for 1, 1.5 and 2% $SiO_2$ respectively, they exemplify the trend of curves for other values, which can be readily determined or calculated.

As will now be seen, the invention provides superior procedure and novel and convenient apparatus for the continuous production of a silica sol in aqueous medium, preferably aged to a desired extent. Accurate but convenient control is afforded as to the rate of production and the characteristics of the material, and conditions are easily achieved for permitting a desirably short gel induction period and correspondingly short aging time, with unusual uniformity of product and with the important advantages that have been explained above.

It is to be understood that the invention is not limited to the specific processes and instrumentalities herein shown and described, but may be carried out in other ways without departure from its spirit.

I claim:

1. Apparatus for treating sodium silicate to produce a silica sol in aqueous medium, comprising: means for delivering a flow of chlorine gas at a predetermined, metered rate; a chlorine dissolving device comprising solution chamber means adapted to receive said chlorine flow from the first-mentioned means, a vessel in said chamber means open to said chlorine flow and adapted to receive water and arranged for overflow of water therefrom, and jet means for delivering water into said vessel in jet form, for turbulent exposure of said water received in the vessel and overflowing therefrom, to the received chlorine gas, to produce a dissolved content of chlorine in said overflowing water; means for supplying water to said jet means at a predetermined, metered rate, mixing chamber means having a passage opening therein and opening into a lower part of said solution chamber means, to receive chlorine-containing water overflowing from the aforesaid vessel, said mixing chamber means being adapted to hold a body of liquid and having outlet means for discharge of a flow of liquid therefrom, and means for feeding sodium silicate solution to said mixing chamber means at a predetermined, metered rate, for introduction into the liquid therein to constitute said liquid as a silica sol product for discharge in said outlet means.

2. Apparatus for treating sodium silicate to produce a silica sol in aqueous medium, comprising: means having a delivery conduit and sensitive to negative pressure for delivering a flow of chlorine gas in said conduit at a predetermined, metered rate; a chlorine dissolving device comprising solution chamber means connected to said conduit to receive said chlorine flow from the first-mentioned means, a vessel in said chamber means open to said chlorine flow and adapted to receive water and arranged for overflow of water therefrom and jet means for delivering water into said vessel in jet form, for turbulent exposure of said water received in the vessel and overflowing therefrom, to the received chlorine gas, to produce a dissolved content of chlorine in said overflowing water; means for supplying water to said jet means at a predetermined, metered rate, mixing chamber means, having a passage opening therein and opening into a lower part of said solution chamber means, to receive chlorine-containing water overflowing from the aforesaid vessel, said mixing chamber means being adapted to hold a body of liquid and having aspirator means associated therewith and supplied with diluent water for withdrawing liquid from said mixing chamber means, said aspirator means having a suction-producing opening exposed within the chamber means, for said liquid withdrawal and for establishing negative pressure through the aforesaid passage and the solution chamber means to effectuate supply of chlorine gas by the first-mentioned means, and means for feeding sodium silicate solution to said mixing chamber means at a predetermined, metered rate, for introduction into the liquid therein to yield a silica sol for withdrawal by said aspirator means, said mixing chamber means including means for agitating the liquid therein to promote reaction of chlorine with sodium silicate.

3. Apparatus as described in claim 2, wherein the agitating means comprises means including a conduit extending into the mixing chamber means and responsive to negative pressure established by the aspirating means, for introducing air at a locality submerged in said mixing chamber means, to agitate the solution by said air.

4. Apparatus for treating sodium silicate to produce a silica sol in aqueous medium, comprising: means having a delivery conduit and sensitive to negative pressure for delivering a flow of chlorine gas in said conduit at a predetermined, metered rate; a chlorine dissolving device comprising solution chamber means connected to said conduit to receive said chlorine flow from the first-mentioned means, a vessel in said chamber means open to said chlorine flow and adapted to receive water and arranged for overflow of water therefrom and jet means for delivering water into said vessel in jet form, for turbulent exposure of said water received in the vessel and overflowing therefrom, to the received chlorine gas, to produce a dissolved content of chlorine in said overflowing water; means for supplying water to said jet means at a predetermined, metered rate, mixing chamber means, having a passage opening therein and opening into a lower part of said solution chamber means, to receive chlorine-containing water overflowing from the aforesaid vessel, said mixing chamber means being adapted to hold a body of liquid and having aspirator means associated therewith and supplied with diluent water for withdrawing liquid from said mixing chamber means, said aspirator means having a suction-producing opening exposed within the chamber means, for said liquid withdrawal and for establishing negative pressure through the aforesaid passage and the solution chamber means to effectuate supply of chlorine gas by the first-mentioned means, and means for feeding sodium silicate solution to said mixing chamber means at a predetermined, metered rate, for introduction into the liquid therein to yield a silica sol for withdrawal by said aspirator means, said mixing chamber means including means for agitating the liquid therein to promote reaction of chlorine with sodium silicate, and the aforesaid apparatus including a conduit extending from the first-mentioned chamber means into the mixing chamber means, constituting the aforesaid passage, said mixing chamber means being disposed below the first chamber means for flow by gravity of chlorine-containing water into the mixing chamber means through said conduit and said conduit having a wide cross-section relative to the supply of water to the first-mentioned chamber means, for continuous transfer of said water without filling said conduit, and for simultaneous transfer of undissolved gas into the mixing chamber means.

5. Apparatus for treating sodium silicate to produce a silica sol in aqueous medium, comprising chlorine solution production means for delivering a flow of aqueous chlorine solution, said solution delivering means comprising a dissolving device and means having a delivery connection to said device and responsive to negative pressure in said connection for feeding chlorine gas to said dissolving device, mixing chamber means for receiving chlorine solution, passage means extending from the dissolving device to the chamber means for introducing said chlorine solution to the chamber means from the solution delivering means, said dissolving device providing communication between said passage means and said gas feeding means, means for feeding silicate solution to said mixing chamber means, and aspirating ejector means including inlet and outlet conduit means extending into said mixing chamber means and carrying a flow of dilution water, and having a suction-producing opening exposed within the chamber means, for withdrawing aqueous silica sol product from the mixing chamber means, in dilution with said last-mentioned water, and for producing negative pressure at an upper part of said mixing chamber means, to be communicated through the passage means and dissolving device, to effectuate flow of chlorine gas from the gas feeding means to the solution device.

6. Apparatus as described in claim 5 wherein the mixing chamber means includes a vessel, head structure for sealing the same, and rapidly releasable means for connecting said head structure and vessel, said head structure being traversed by the passage means for introducing chlorine solution and the means for feeding silicate solution to the chamber means and by the conduit means for the ejector device, whereby upon disconnection of said head and vessel, both of the aforesaid solution introducing means and the ejector means remain associated with said head.

7. In apparatus for treating sodium silicate to produce a silica sol in aqueous medium, mixing chamber means having means for inlet of reagent liquid and ejector outlet means for withdrawing liquid product in diluted form, said ejector outlet means comprising jet means opening within the chamber means and having connection for water supplied thereto to produce a jet of dilution water within the chamber means, discharge conduit means having an outlet opening within the chamber means closely facing said jet means for direction of said jet into said outlet to produce reduced pressure around said jet by aspirator action, for drawing aqueous sol product from the chamber means into said outlet means, and means maintaining said jet means and outlet means in predetermined, closely spaced relation.

8. In apparatus for treating sodium silicate to produce a silica sol in aqueous medium, chamber means having reagent supply means connected thereto and adapted for continuous production therein of aqueous silica sol product and aspirating ejector means in the chamber means for removing said product in diluted form, said ejector means comprising inlet and discharge conduits respectively having openings of reduced size and spaced in close facing relation, for delivery of a jet of dilution water from the inlet conduit into the discharge conduit to produce reduced pressure between the conduits for drawing the aqueous product into said discharge conduit with the dilution water.

9. Apparatus for treating sodium silicate to produce a silica sol in aqueous medium, comprising means having an outlet and responsive to negative pressure in said outlet, for delivering chlorine gas, mixing chamber means, conduit means extending from the outlet of said chlorine delivering means to said mixing chamber means, solution means arranged in said conduit means and having connections for receiving a supply of water for dissolving chlorine in water and for directing the resulting chlorine solution along the conduit means to the mixing chamber means, means for supplying sodium silicate solution continuously to said mixing chamber means, aspirating ejector means supplied continuously with water, and having a suction-producing opening exposed within said chamber means, for withdrawing aqueous silica sol product from the chamber means with dilution by said last-mentioned water and for producing negative pressure in an upper part of said chamber means, said conduit means being arranged for response to said negative pressure to transmit negative pressure from the chamber means to the chlorine delivery means, for effecting advance of chlorine gas from said chlorine delivery means, and means for introducing air into said mixing chamber means for agitation of liquid therein.

10. Apparatus as described in claim 9, wherein the first-mentioned conduit means extends from the solution device into said mixing chamber means to a lower locality thereof, said air-introducing means being connected with and being inclusive of said conduit means between the solution device and the chamber means, and said air introducing means comprising an adjustable, pressure-controlled air inlet valve for delivering said air to said conduit in quantity to maintain a predetermined negative pressure in the conduit.

11. Apparatus for treating sodium silicate to produce a silica sol in aqueous medium, comprising mixing chamber means to hold liquid, aspirating ejector means therein carrying dilution water and having a suction-producing opening exposed within the chamber means, for withdrawing liquid from the mixing chamber means in dilution with said water and for producing negative pressure in an upper part of said mixing chamber means, means for supplying silicate solution to said mixing chamber means, conduit structure adapted at one end to receive chlorine gas and at its other end extending into said mixing chamber means so that the state of pressure in the chamber means is communicated into and through said conduit structure, said conduit structure including constant pressure means, orifice means in the conduit structure downstream of the constant pressure means, a solution device supplied with water and arranged in the conduit structure between the orifice means and the mixing chamber means for establishing chlorine solution and delivering same through the conduit structure to the mixing chamber means, and throttle valve means in the conduit structure between the orifice and the solution device, for controlling the flow of chlorine gas.

12. Apparatus as described in claim 11, wherein the conduit structure opens at an upper part of the mixing chamber means above the liquid level therein, said apparatus including air inlet means opening in said mixing chamber at a locality submerged remotely below the level of liquid therein, for admission of air to agitate the liquid in said chamber and for relieving the negative pressure produced by the aspirating ejector means to a predetermined value below atmospheric pressure.

References Cited in the file of this patent

UNITED STATES PATENTS

| 1,530,833 | Keeler | Mar. 24, 1925 |
| 2,063,140 | Allison | Dec. 8, 1936 |
| 2,513,562 | Holuba | July 4, 1950 |
| 2,567,285 | Hay | Sept. 11, 1951 |

UNITED STATES PATENT OFFICE
CERTIFICATION OF CORRECTION

Patent No. 2,935,482            May 3, 1960

Mitchell H. Cubberley

It is hereby certified that error appears in the above numbered patent requiring correction and that the said Letters Patent should read as corrected below.

Column 1, line 47, strike out "the", first occurrence; column 2, line 3, for "NaO" read -- $Na_2O$ --; column 10, line 31, for "tail way" read -- tailway --; column 14, line 7, for "diagram" read -- diaphragm --; column 15, line 4, for "adsorbed" read -- absorbed --.

Signed and sealed this 6th day of June 1961.

(SEAL)
Attest:

ERNEST W. SWIDER
Attesting Officer

DAVID L. LADD
Commissioner of Patents